May 21, 1940. K. FRIEDRICH ET AL 2,201,165
HYDRAULIC CIRCUIT BRAKE AND ITS APPLICATION IN RAIL AND ROAD VEHICLES
Filed Feb. 6, 1936 3 Sheets-Sheet 1
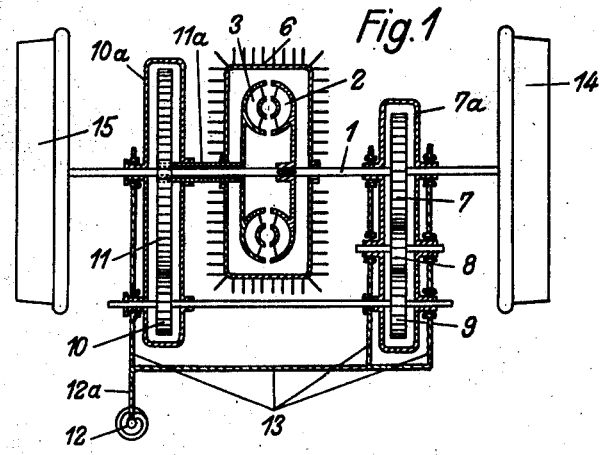
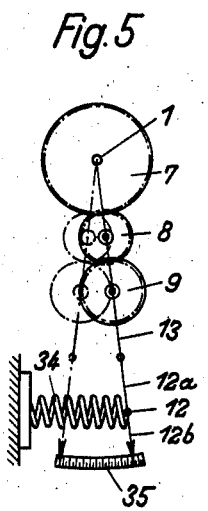
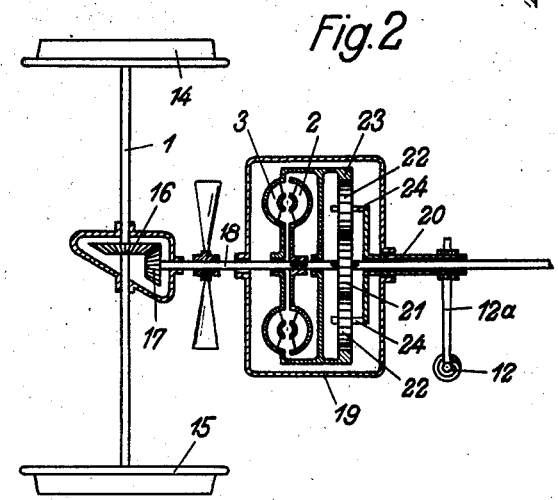
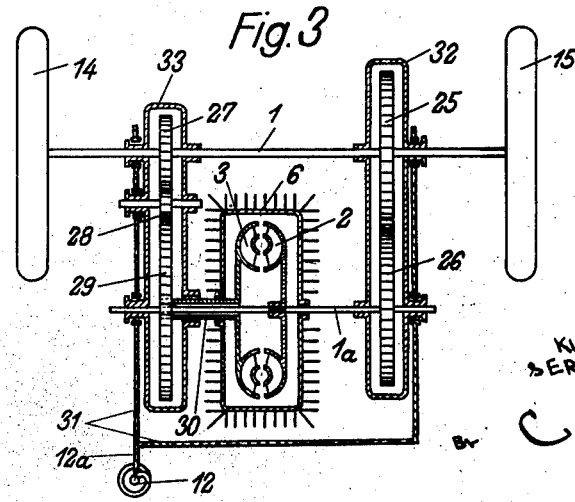
INVENTORS
KURT FRIEDRICH
& ERNST SEIBOLD
ATTORNEY.

May 21, 1940. K. FRIEDRICH ET AL 2,201,165
HYDRAULIC CIRCUIT BRAKE AND ITS APPLICATION IN RAIL AND ROAD VEHICLES
Filed Feb. 6, 1936 3 Sheets-Sheet 2

INVENTORS
KURT FRIEDRICH
& ERNST SEIBOLD

ATTORNEY

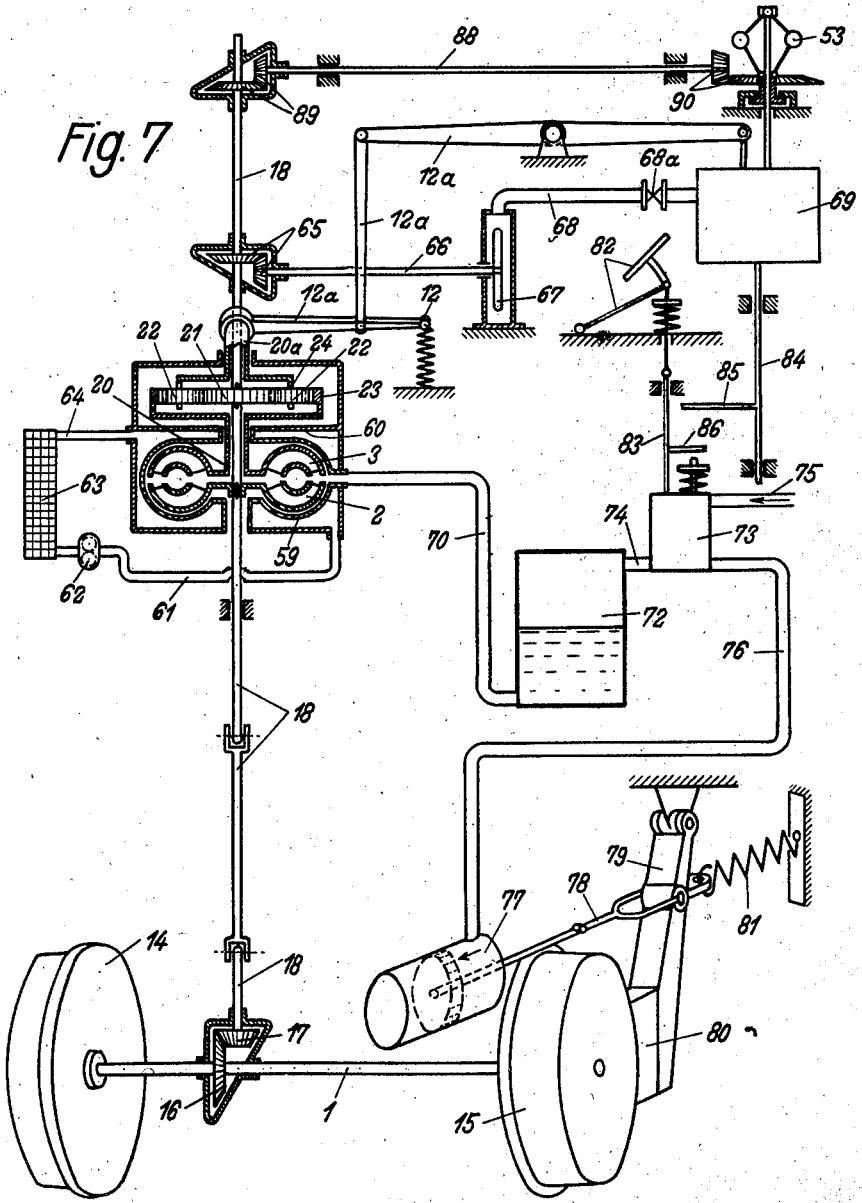

Patented May 21, 1940

2,201,165

UNITED STATES PATENT OFFICE

2,201,165

HYDRAULIC CIRCUIT BRAKE AND ITS APPLICATION IN RAIL AND ROAD VEHICLES

Kurt Friedrich, Munich, and Ernst Seibold, Heidenheim-on-the-Brenz, Wurttemberg, Germany, assignors to J. M. Voith, Heidenheim-on-the-Brenz, Germany, a copartnership composed of Walther Voith, Hermann Voith, and Hans Voith Application February 6, 1936, Serial No. 62,660
In Germany February 7, 1935

14 Claims. (Cl. 188—153)

The invention refers to a hydraulic circuit brake and is more particularly intended for use in connection with rail and road vehicles and for use in combination with a friction brake.

Hydraulic circuit brakes are frequently used to determine the output of high speed power engines. Their principal advantages are: favorable nullification of energy, easy adjustability and the impossibility of blocking the operation of the installation when applying the hydraulic circuit brake, inasmuch as with any kind of hydraulic circuit brake the braking power changes with the square of the driving speed. Such hydraulic circuit brakes chiefly consist of a runner equipped with vanes or resistance bodies and a stationary counter wheel of similar design.

The chief disadvantage of the known types of hydraulic circuit brakes is that if the installation to be controlled by the brakes, runs at low speed, the hydraulic circuit brake must be of very large dimensions and this means that it will be uneconomical in many instances.

With the present invention, this disadvantage is avoided by the feature that the installation to be braked simultaneously drives two co-axial runners arranged to move in opposite directions with respect to each other and acting on each other by means of an intermediate fluid. This arrangement permits a considerable increase in the relative speed between the two runners, and this alone influences the braking effect, whereby it is made possible to obtain sufficient braking effects with hydraulic circuit brakes of small dimensions even in connection with low speed machinery. It will be advantageous for one of the runners moving in opposite direction, if the speed thereof be as high as possible considering the mechanical stresses. For this reason the two runners moving in opposite directions to each other will run at different speeds which differ the more the normal speed of the installation under braking action be lowered.

It will be possible to have one of the runners connected directly with the driving shaft and the other one with the driving shaft through driving means of known type, such as toothed wheels or friction gears, or to have both runners driven through such means. The latter arrangement may then be necessary if the hydraulic circuit brake cannot be arranged co-axially with the machinery to be braked for reasons of the limited space available.

If the runners are designed similar to the fluid circuit couplings of known type, the simplest and most effective fluid circuit brake is obtained, and particularly so if the machinery is to be braked to the same extent in both directions of rotation. Under special circumstances it may prove of advantage to have one or more stationary runners arranged for example, as in a turbo converter, in addition to the two rotating runners. Such brakes exert a considerably greater braking effect in one direction of rotation than in the other. If for one reason or another hydraulic circuit brakes with stationary runners are used, and in spite of this the same braking effect in both directions of rotation is to be obtained, it is desirable to arrange one of these brakes for each direction, the same being advantageously designed with congruently shaped vanes and arranged coaxially and symmetrically. The same braking effect will then be obtained for both directions of the machinery to be braked, the results being as average value between the braking effects of the various circuits. The described symmetrical arrangement of the circuits with runners having congruently shaped vanes offers the advantage that the runners can be cast from the same patterns. It is of importance for keeping the production costs low that the walls of the fluid canals of such hydraulic circuit brakes need not be machined.

The heat produced in the braking fluid while braking, can be eliminated by known means, such as cooling by ribs and ventilation of the outer walls, cooling down by special coolers or by partial evaporation of the working fluid.

The regulation of the hydraulic circuit is done in the known way by regulating the quantity of the working fluid. This regulation is chiefly done at will but may also be effected by known means in dependence on the speed or the braking torque according to any desired law. In this connection the speed can be measured in a very simple way by a fluid tachometer filled with the working liquid. The torque can be measured by means of a resilient supporting device for the reaction torque. The deflection of this torque support will then be proportional to the braking torque exerted.

If the hydraulic circuit brake shall be regulated in mutual dependence on the speed and torque, it will be particularly advantageous to regulate the supply and discharge to the hydraulic circuit brake by some regulating device common for both speed and torque. It will be useful to have this regulating device moved on the one hand by the measuring pressure of the above described fluid tachometer and on the other hand by the deflection of the torque support. In special cases it will be necessary to regulate the quantity of the working fluid, at will, besides the described regulation in dependence on speed and brake torque.

The filling and emptying of the brake is very simple if done by a scoop tube of known type which may be stationary in the majority of cases.

Recent endeavors to substantially increase the traveling speeds of rail as well as road vehicles have led to considerable difficulties as regards the braking means as the moving energy of the vehicle which is to be destroyed by the braking effect, increases with the square of the traveling speed. It has been noted, and particularly so with rail vehicles, that in case of speeds of 140-160 km./hour, as required nowadays of fast trains, the friction brake in use so far and which incorporates a high degree of safety for speeds up to 100 km., hardly meets the requirements. The difficulties arise chiefly from the fact that the total moving energy at the brake shoes must be converted into friction heat which highly heats up the braking device. Further difficulties are encountered in that the friction coefficient very greatly depends on the sliding speed in so far as it decreases with increasing speed. From this it results that when the braking power exceeds the friction power between wheel and rail the wheel set at once becomes blocked and can be released only by the driver through releasing the brake.

These difficulties may be overcome through combining a friction brake device, and a hydraulic circuit brake in such a way that, in the range of higher traveling speeds, chiefly the hydraulic circuit brake is applied to exert the braking effect, while the friction brake in the range of lower speeds is applied to bring the vehicle to a stop. By changing the quantity of the fluid in the hydraulic circuit brake it will be possible to obtain with it any desired braking effect at any speed up to the maximum limit possible. This has the following advantages:

(1) That the braking effect is produced in the liquid only; therefore there is no wearing of metallic parts.

(2) That the braking energy is converted into heat which can be easily eliminated from the liquid by cooling devices of known designs.

(3) That no blocking of the wheel set can occur. Should accidentally the braking power exerted be greater than the friction power between wheel and rail, then the speed of the wheel braked decreases so long until the balance between the braking effect and the friction power at the rail is restored. This is possible for reason of the fact that the braking power of the hydraulic circuit brake decreases with the square of the speed of the wheel set.

This exceedingly important advantage does not exclude on the other hand the disadvantage that the vehicle cannot be brought to a stop with the hydraulic circuit brake only and, therefore, the latter can be employed only as combinative means to the already existing friction brake. The latter must then be designed only for low speeds and will not be subject to any wear of importance. The cost of maintenance for the brake installation and thus the cost of upkeep of the vehicle are greatly reduced while the operating safety increases in a very considerable extent.

Such a brake installation will prove particularly valuable if the usual means, such as brake lever, brake valve, etc, are retained for its operation in order to enable the driver to operate the hydraulic circuit brake in exactly the same way as the friction brake so far used and to permit vehicles with and without hydraulic circuit brakes to be combined in one and the same train. In the case of air brakes (air pressure or suction brakes) as generally employed the braking effect is exerted on a piston by pressure and regulated by changing this pressure. The hydraulic circuit brake shall be empty when driving and filled for braking purposes, the greater the hydraulic pressure the greater the braking effect will be. With the hydraulic circuit brake empty the liquid is stored in a tank. According to the invention, the same procedures which would otherwise produces a difference of air pressure on the two piston sides of the friction brake, now effect a difference of air pressure between tank and hydraulic circuit brake with the result that the hydraulic circuit brake is being more filled at an intended higher braking effect, and vice-versa. The entire arrangement will be made in such a way that in the first instance only the hydraulic circuit brake exerts the braking effect; only when it is completely filled will in addition the friction brake be applied for braking from a certain traveling speed down.

The pressures of liquid occurring in the hydraulic circuit brake permit to measure in an easy way the speed and the braking power with an exactitude sufficient for the brake regulation. It will also be possible to regulate automatically the distribution of the braking effect on the hydraulic circuit and friction brakes in dependence on speed and braking power so that the friction limit between wheel and rail will not be exceeded under any condition of operation.

Besides, it will be possible without any additional installation and as far as it is required at all, to have the friction brake cooled with the working liquid of the hydraulic circuit brake.

In case of railcars having their own power source and having power transmission, including hydraulic transmissions an advantageous arrangement will result as one or several of the existing hydraulic transmissions may be used as hydraulic circuit brake. In such cases the installation of a special hydraulic circuit brake will be available.

The drawings show diagrammatic arrangements of the subject matter of the invention, viz.:

Fig. 1 is a sectional view of a hydraulic circuit brake with spur gears.

Fig. 2 is another sectional view but showing the device equipped with planetary gears.

Fig. 3 is still another sectional view but showing both runners driven from the axle over spur wheels.

Fig. 5 shows an arrangement of a hydraulic circuit brake with torque measuring means.

Fig. 7 shows a brake assembly with hydraulic circuit and friction brakes.

Fig. 8 shows a brake circuit with scoop tubes.

Figure 4:
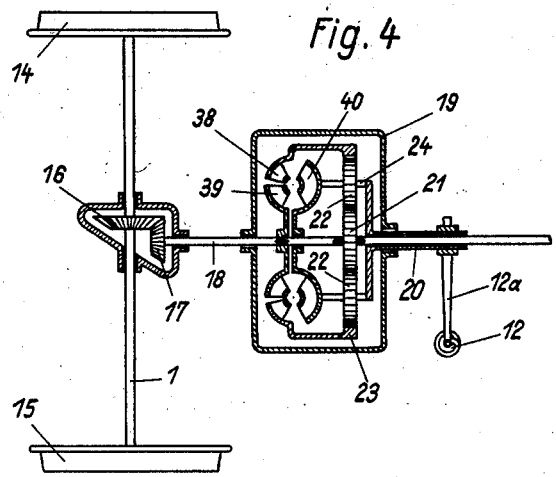
Fig. 4 is a sectional view of a hydraulic circuit brake with two rotating runners and one stationary guide wheel with planetary gear.

Fig. 1 shows runner 2 firmly connected with wheels 14 and 15 on running axle 1. A second runner 3 seated on hollow shaft 11a is driven in the opposite direction to runner 2 through spur gears 7, 8, 9, 10 and 11. Runners 2 and 3 are surrounded by housing 6 equipped with ribs for cooling the working fluid in same. Spur gears 7, 8 and 9 are surrounded by housing 7a, and spur gears 10 and 11 by housing 10a. The torques produced when braking are transmitted by frame 13 mounted to oscillate around axle 1 and operated by lever 12a from point 12 when they may be used to control the brake liquid.

Fig. 2 shows a hydraulic circuit brake driven through bevel wheels 16 and 17 from running axle 1 by wheels 14 and 15. Runner 2 of the hydraulic circuit is driven in one direction by shaft 18 while runner 3 is driven in the opposite direction to runner 2 by a planetary gear with wheels 21, 22 and 23. The two intermediate wheels 22 rotate on fixed axles 24 connected with stationary hollow shaft 20. The torque produced when braking is transmitted by hollow shaft 20 through lever arm 12a to control point 12. The hydraulic circuit and the planetary gear are surrounded by common housing 19.

Fig. 3 shows a similar arrangement of the hydraulic circuit brake to that given in Fig. 1 with the difference that the two runners are driven from running axle 1 through spur wheels 25 and 26 or 27, 28 and 29. Runners 14 and 15 are mounted on the two sides of running axle 1. Runners 2 and 3 rotating in opposite direction to each other are surrounded by housing 6 equipped with ribs for cooling purposes. Runner 3 is connected with spur wheel 29 through hollow shaft 30 while runner 2 is mounted on through-going axle 1a. Spur wheel gears 25 and 26 are surrounded by housing 32 while gears 27, 28 and 29 are surrounded by housing 33. Frame 31 oscillating around axle 1, together with lever arm 12a and control point 12 serve to transmit the moments.

Fig. 4 shows the same arrangement as Fig. 2 with the difference that stationary guide wheel 40 is interconnected between the two rotating runners 38 and 39.

In the foregoing embodiments of Figs. 1 to 4, as in the other embodiments hereinafter to be described, the braking effect is produced by the admission of a fluid between runners 2 and 3, the amount of liquid admitted determining the intensity of the braking effect at a given relative speed between the two runners. The means for supplying fluid to the runners 2 and 3 consist of a fluid supply pipe discharging its fluid between the runners together with control means for regulating the amount of fluid admitted. When it is desired to reduce the braking effect or interrupt the same, the supply of fluid is throttled or completely shut off, while the fluid is discharged from the runners and returned to a supply tank by a return pipe. An embodiment of the structures necessary to carry out this action will be described hereinafter in connection with Fig. 6.

Fig. 5 shows a side view of the torque transmission on point 12 at which frame 13 swinging around axle 1 presses on spring 34 fixed for instance at the vehicle frame. The deflection corresponding to the braking torque is indicated by pointer 12b on scale 35. The torque deflection may be used to control the brake installation. The illustration shows spur gears 7, 8 and 9.

Figure 6:
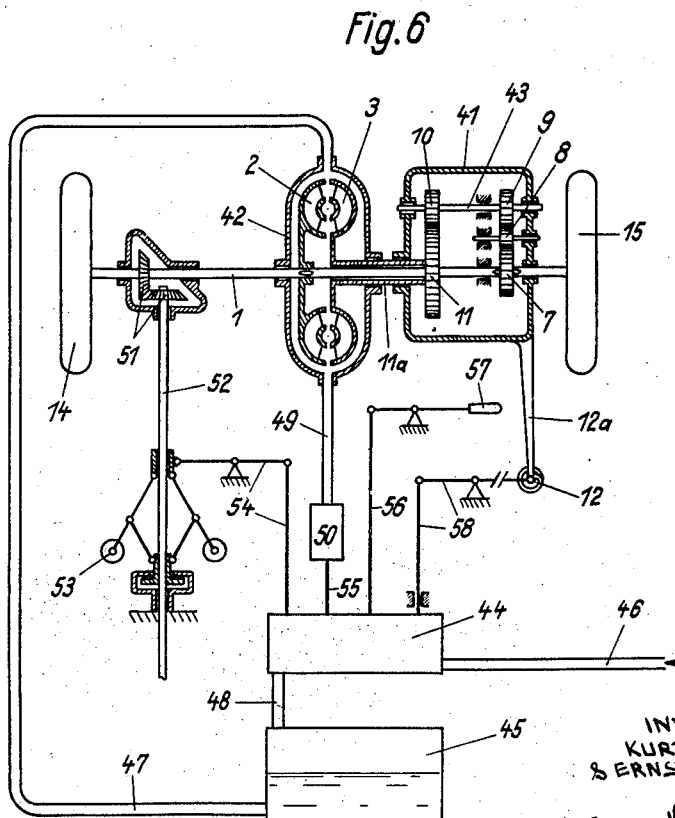
Fig. 6 shows a control diagram for the operation of the hydraulic circuit brake.

Fig. 6 shows a control diagram of the operation of the hydraulic circuit brake, the regulation of the quantity of fluid of the hydraulic circuit being effected either by the torque produced when braking, or by hand. Wheels 14 and 15 are arranged again on running axle 1. Runner 2 is firmly connected with shaft 1 while runner 3 rotating in an opposite direction is driven by intermediate gears 7, 8, 9, 10 and 11. The speed of the shaft 11a is lower than the speed of the shaft 1 when the gearing 10 and 11 shown in the drawing is used. If it is desired to have shaft 11a at a higher speed than shaft 1, the gearing 10 and 11 can be modified accordingly in the manner well known in the gearing art. Hollow shaft 11a is arranged between spur wheel 11 and runner 3. The hydraulic circuit brake itself is surrounded by housing 42 while the spur gear is surrounded by housing 41. There is lever 12a arranged at housing 41 acting on torque control point 12, and operating from there so as to regulate valve 44 through rods 58. Regulating valve 44 may also be influenced by hand through rod 56 and lever 57; also through pressure piping 49 connected with the brake circuit, intermediate valve 50 and operating rod 55. Finally, centrifugal regulator 53 may act in dependence on the speed on regulating valve 44 through rods 54. Centrifugal regulator 53 is driven from running axle 1 over angle wheels 51 and axle 52. If for instance compressed air is used as a control means, the compressed air is supplied to regulating valve 44 through piping 46. Control piping 48 connects regulating valve 44 with tank 45 containing the working fluid with which brake circuits 2 and 3 are fed through piping 47 by means of compressed air in accordance with the actual opening of the regulation valves.

Fig. 7 shows a control diagram of a friction brake in combination with a hydraulic circuit brake as an additional brake. Shaft 18 is driven through mitre gear 16—17 from running axle 1 carrying wheels 14 and 15. Runner 2 is firmly connected to shaft 18 while runner 3 is driven through planetary wheels 21, 22 and 23. Brake circuit 2—3 is surrounded by casing 59 which in turn is enclosed in housing 60. Cooling liquid is introduced into this hollow space supplied and discharged by pump 62 through cooler 63 and pipings 64 and 61. To regulate the braking effect either mechanically operated lever 82, or centrifugal regulator 53, or some torque regulation from point 12 is employed. Centrifugal regulator 53 is driven through shafts 18 and 88 and also over bevel wheel pairs 89 and 90. The various control influences on the hydraulic circuit brake act on regulating valves 69 and 73 in such a way that rods 84 and 85 are automatically moved by actuation of the regulator 53 or by the torque operated lever 12a, or by the device 67. The rods 83 and 86 are operated by hand, that is, by the foot pedal 12. Rods 85 and 86, respectively, operate valve 73. On the assumption that air is used as a control means, as described above, compressed air is conveyed to advance control valve 73 through piping 75. It will be possible to influence therefrom hydraulic circuit 2 and 3 or friction brake 80 in accordance with the speed prevailing at the time when braking is effected. As soon as the vehicle has slowed down to a certain speed the friction brake will be applied automatically by the installation to act as an additional brake to the hydraulic circuit brake. Compressed air led to tank 72 through piping 74 induces the working fluid to get to the hydraulic circuit through piping 70. A second piping 76 connects valve 73 with control piston 77 acting on friction brake 80 over rods 78 and 79. Draw springs 81 serve to release the friction brake. The pressure existing in hydraulic circuits 2 and 3 can also be used to operate regulation valve 69. The control manipulations may also be influenced in accordance with the extent of the prevailing pressure by installation 67 driven from shaft 18 through mitre gear 65 and shaft 66. Piping 68 is fitted with shut-off valve 68a.

Finally, Fig. 8 shows scoop tube 92 which is installed in the hydraulic circuit as a stationary element and conveys the working fluid under the actually prevailing pressure to regulating valve 69 through piping 68. The structure of the hydraulic air brake shown in Figure 4 may be used in place of the structure shown in Figure 7. The structure shown in Figure 8 may be used in place of the structure of the circuit brake shown in Figure 7.

As many changes could be made in the above constructions and many apparently widely different embodiments of this invention could be made without departing from the scope thereof, it is intended that all matter and forms shown in the accompanying drawings and contained in the above description shall be interpreted as illustrative and not in a limiting sense, other than as set forth in the appended claims.

We claim:

1. A device for braking rail and road vehicles, comprising, a driven member, a friction type brake for the driven member, a hydraulic circuit brake having two coaxial runners, one of said runners being rotated by said driven member, the other of said runners being operable in respect to the first runner at a relative speed difference, and means for controlling the admission of fluid to the hydraulic circuit brake, said fluid acting on the runners, whereby said hydraulic circuit brake acts to brake the driven member, the rotation of the driven member continuing during the application of the friction brake, prior to the standstill of the driven member.

2. A device for braking rail and road vehicles, comprising, a driven member, a friction type brake for the driven member, an hydraulic circuit brake having two coaxial runners, one of said runners being rotated by said driven member in one direction, the other of said runners being driven also by said driven member but in the opposite direction, and means for controlling the admission of fluid to the hydraulic circuit brake, said fluid acting on the runners, whereby said hydraulic circuit brake acts to brake the driven member, the rotation of the driven member continuing during the application of the friction brake, prior to the standstill of the driven member.

3. A device for braking rail and road vehicles, comprising a driven member, a friction type brake for the driven member, an hydraulic circuit brake having two coaxial runners, one of said runners being rotated by said driven member in one direction, the other of said runners being driven by said driven member but in the opposite direction, means for rotating one of the runners at an absolute speed different from that of the other runner, and means for controlling admission of fluid to the hydraulic circuit brake, said fluid acting on the runners, whereby said hydraulic circuit brake acts to brake the driven member, the rotation of the driven member continuing during the application of the friction brake, prior to the standstill of the driven member.

4. A device for braking rail and road vehicles, comprising a driven member, a friction type brake for the driven member, an hydraulic circuit brake having two coaxial runners, one of said runners being rotated by said driven member in one direction, the other of said runners being driven also by said driven member but in the opposite direction, characterized by the fact that the ratio between the speeds of the two runners is selected the greater, the lower the normal speed of the driven member to be braked, and means for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

5. A device for braking rail and road vehicles, comprising, a driven member, a friction type brake for the driven member, an hydraulic circuit brake having two coaxial runners, one of said runners being rotated by said driven member in one direction, the other of said runners being driven also by said driven member but in the opposite direction, characterized by the fact that one of said runners is directly connected with the driven shaft and the other with a driving shaft by means of gears, and means for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

6. A device for braking rail and road vehicles, comprising, a driven member, a friction type brake for the driven member, an hydraulic circuit brake having two coaxial runners, one of said runners being rotated by said driven member in one direction, the other of said runners being driven by said driven member in the opposite direction, characterized by the fact that both runners are driven by a driving shaft over gears, and means for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

7. A device for braking rail and road vehicles, comprising, a driven member, a friction brake for the driven member, an hydraulic circuit brake having two coaxial runners, one of said runners being rotated by said driven member in one direction, the other runner being driven by said driven member in the opposite direction, said runners having congruently shaped vanes arranged coaxially and symmetrically, and means for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

8. A device for braking rail and road vehicles, comprising, a driven member, a friction type brake for the driven member, an hydraulic circuit brake having two coaxial runners, one of said runners being rotated by said driven member in one direction, the other runner being driven by said driven member in the opposite direction, a stationary member coacting with said runners, and means for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

9. A device for braking rail and road vehicles, comprising, a driven member, a friction type brake for the driven member, an hydraulic circuit brake having two coaxial runners, one of said runners being rotated by said driven member in one direction, the other of said runners being driven by said driven member in the opposite direction, means for eliminating the heat of the braking fluid, and means for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

10. A device for braking rail and road vehicles, comprising, a driven member, a friction type brake for the driven member, an hydraulic circuit brake having two coaxial runners, one of said runners being rotated by said driven member in one direction, the other runner being driven by said driven member in the opposite direction, means for regulating the quantity of working fluid at will, and means for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

11. A device for braking rail and road vehicles, comprising, a driven member, a friction type brake for the driven member, an hydraulic circuit brake having two coaxial runners, one of said runners being rotated by said driven member in one direction, the other runner being rotated by said driven member in the opposite direction, means for regulating the quantity of the braking fluid by the speed of the vehicle, and means for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

12. A device for braking rail and road vehicles, comprising, a driven member, a friction type brake for the driven member, an hydraulic circuit brake having two coaxial runners, one of said runners being rotated by said driven member in one direction, the other runner being driven by said member in the opposite direction, a fluid tachometer, means indicating the pressure of the same, a torque support, means indicating the amount of the torque, a device common to said pressure indicating means and said torque indicating means, and means operated by said common device for controlling the admission of fluid to the hydraulic circuit brake, said fluid acting on the runners, whereby said hydraulic circuit brake acts to brake the driven member, the rotation of the driven member continuing during the application of the friction brake prior to the standstill of the driven member.

13. A device for braking rail and road vehicles, comprising a driven member, a friction type brake for the driven member, an hydraulic circuit brake having two coaxial runners, each of said runners being rotated by said driven member in opposite directions, a foot pedal for initiating the operation of the circuit brake and of the friction brake, means actuated by said pedal for supplying the circuit brake with fluid for putting the same into operation, means actuated by the pressure of the fluid in the circuit brake, means actuated by the torque produced by the circuit brake, means actuated by the speed of the vehicle, means actuated by any of said last named three actuated means for actuating the friction brake, and means for controlling the admission of fluid acting on said runners to the hydraulic circuit brake, whereby the latter acts to brake the driven member, the rotation of the same continuing during the application of the friction brake prior to the standstill of the driven member.

14. A hydraulic brake for rail and road vehicles, having a driven shaft, comprising a runner secured to said driven shaft, a second runner cooperating with the first runner, means actuated by the driven shaft for rotating said second runner in the opposite direction of rotation to that of the first runner, and means for controlling the admission of fluid between the two runners, whereby the fluid action between the two runners tends to reduce the relative speed of rotation between the two runners, creating the desired braking effect.

KURT FRIEDRICH.
ERNST SEIBOLD.